(12) United States Patent
Klein et al.

(10) Patent No.: US 10,729,081 B2
(45) Date of Patent: *Aug. 4, 2020

(54) HYDROPONIC TOWER WITH HINGED TOWER FACE

(71) Applicant: MJNN, LLC, South San Francisco, CA (US)

(72) Inventors: Brice Klein, San Francisco, CA (US); Michael Flynn, Palo Alto, CA (US); Alexandre Le Roux, Menlo Park, CA (US); Matthew Matera, San Francisco, CA (US); Alex Ibrahim, Ukiah, CA (US); Frank Spiteri, Palo Alto, CA (US)

(73) Assignee: MJNN, LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,322

(22) Filed: Sep. 20, 2019

(65) Prior Publication Data

US 2020/0015439 A1 Jan. 16, 2020

Related U.S. Application Data

(63) Continuation-in-part of application No. 15/968,425, filed on May 1, 2018, which is a continuation-in-part of application No. 15/910,601, filed on Mar. 2, 2018.

(51) Int. Cl.
*A01G 31/02* (2006.01)

(52) U.S. Cl.
CPC .................................... *A01G 31/02* (2013.01)

(58) Field of Classification Search
CPC ........ A01G 9/022; A01G 9/023; A01G 9/047; A01G 31/04; A01G 31/06
See application file for complete search history.

(56) References Cited

U.S. PATENT DOCUMENTS

| 1,709,860 | A | * | 4/1929 | Lovett, Jr. | A01G 9/026 47/73 |
|---|---|---|---|---|---|
| 3,896,587 | A | * | 7/1975 | Insalaco | A01G 9/021 47/65.5 |
| 4,033,072 | A | * | 7/1977 | Kobayashi | A01G 31/06 47/62 R |
| 4,216,622 | A | * | 8/1980 | Hollenbach | A01G 9/029 47/71 |
| 4,454,684 | A | * | 6/1984 | O'Hare | A01G 9/022 47/82 |
| 4,683,674 | A | * | 8/1987 | Faul | C05F 17/907 47/83 |

(Continued)

*Primary Examiner* — Magdalena Topolski
*Assistant Examiner* — Morgan T Barlow
(74) *Attorney, Agent, or Firm* — Patent Law Office of David G. Beck (57) ABSTRACT

A hinged hydroponic tower utilizing an integrated, single-piece hinge member, thereby allowing the tower face plate to move relative to the tower body. In addition to the hinge, the tower utilizes an integrated fastener to hold the face plate in the closed position. A V-shaped groove may be included on either side of the tower, the grooves increasing the efficiency of delivering water and nutrients to the plants via the narrowed rear cavity wall. The V-shaped grooves may also be used as an alignment aid when coupling planters, harvesters, or other equipment to the tower.

15 Claims, 6 Drawing Sheets

(56) References Cited

U.S. PATENT DOCUMENTS

| | | | |
|---|---|---|---|
| 5,031,359 A * | 7/1991 | Moffett, Jr. | A01G 9/022 47/82 |
| 5,251,399 A * | 10/1993 | Rasmussen | A01G 9/023 211/88.03 |
| 5,363,594 A * | 11/1994 | Davis | A01G 9/022 47/82 |
| 5,555,676 A * | 9/1996 | Lund | A01G 9/022 47/82 |
| 5,913,477 A * | 6/1999 | Dean | A01G 9/12 239/289 |
| 5,918,416 A * | 7/1999 | Ammann, Jr. | A01G 31/02 47/58.1 R |
| 6,357,172 B1 * | 3/2002 | Risgaard | A01G 13/0243 47/32.4 |
| 6,477,805 B2 * | 11/2002 | Ware | A01G 31/02 47/83 |
| 7,143,544 B2 * | 12/2006 | Roy | A01G 31/02 47/60 |
| 7,373,753 B1 * | 5/2008 | Caruso | A01G 9/027 211/182 |
| 8,365,466 B1 * | 2/2013 | Storey | A01G 31/06 47/62 C |
| 8,418,403 B1 * | 4/2013 | Nuttman | A01G 9/024 47/82 |
| 8,919,041 B2 * | 12/2014 | Topping | A01G 9/20 47/66.6 |
| 8,966,819 B1 * | 3/2015 | Cosmann | A01G 9/023 47/83 |
| 9,374,953 B2 * | 6/2016 | Martin | A01G 31/06 |
| 9,814,186 B2 * | 11/2017 | Anderson | A01G 31/06 |
| 10,123,494 B2 * | 11/2018 | Janssen | A01G 9/025 |
| 2003/0089037 A1 * | 5/2003 | Ware | A01G 9/025 47/83 |
| 2005/0166452 A1 * | 8/2005 | Felknor | A01G 9/0291 47/67 |
| 2006/0156624 A1 * | 7/2006 | Roy | A01G 9/025 47/62 R |
| 2008/0078118 A1 * | 4/2008 | Bissonnette | A01G 9/0293 47/63 |
| 2009/0223126 A1 * | 9/2009 | Garner | E04F 13/083 47/66.7 |
| 2010/0146855 A1 * | 6/2010 | Ma | A01G 9/025 47/82 |
| 2011/0083362 A1 * | 4/2011 | Rosenberg | A01G 5/00 47/41.15 |
| 2011/0107667 A1 * | 5/2011 | Laurence | A01G 9/025 47/59 S |
| 2012/0117871 A1 * | 5/2012 | Luckett | A01G 9/023 47/65.7 |
| 2014/0130414 A1 * | 5/2014 | Storey | A01G 31/06 47/62 A |
| 2014/0290137 A1 * | 10/2014 | Nagels | A01G 31/06 47/62 R |
| 2015/0300011 A1 * | 10/2015 | Lopez Otamendi | E04B 2/86 52/27 |
| 2015/0313104 A1 * | 11/2015 | Cottrell | A01G 9/022 47/62 A |
| 2016/0066525 A1 * | 3/2016 | Duquesnay | A01G 31/02 47/62 R |
| 2016/0120141 A1 * | 5/2016 | Stolzfus | A01G 31/06 47/62 A |
| 2017/0055473 A1 * | 3/2017 | Baker | A01G 9/025 |
| 2017/0105372 A1 * | 4/2017 | Bryan, III | A01G 31/06 |
| 2017/0202164 A1 * | 7/2017 | Dufresne | A01G 31/06 |
| 2017/0238486 A1 * | 8/2017 | De Feo | A01G 31/02 |
| 2017/0339841 A1 * | 11/2017 | Monasterio | A01G 31/06 |
| 2018/0000029 A1 * | 1/2018 | Martin | A01G 31/02 |
| 2018/0007849 A1 * | 1/2018 | Cohen | A01G 31/02 |
| 2018/0042186 A1 * | 2/2018 | Kop | A01G 9/246 |
| 2018/0092314 A1 * | 4/2018 | McGuinness | A01G 27/005 |
| 2018/0213734 A1 * | 8/2018 | Smith | A01G 31/06 |
| 2018/0295800 A1 * | 10/2018 | Kiernan | A01G 31/06 |
| 2018/0310499 A1 * | 11/2018 | Van Buuren | A01G 9/022 |
| 2018/0325052 A1 * | 11/2018 | Gru | A01G 31/02 |
| 2019/0082617 A1 * | 3/2019 | Moffitt | A01G 7/02 |
| 2019/0082627 A1 * | 3/2019 | Moffitt | A01G 31/06 |
| 2019/0124866 A1 * | 5/2019 | Maxwell | A01G 31/06 |
| 2019/0200551 A1 * | 7/2019 | Walters | A01G 31/02 |
| 2019/0216029 A1 * | 7/2019 | Wilcox | A01G 31/02 |
| 2019/0269079 A1 * | 9/2019 | Klein | E05D 1/00 |
| 2019/0297787 A1 * | 10/2019 | Klein | A01G 31/02 |

* cited by examiner

HYDROPONIC TOWER WITH HINGED TOWER FACE

CROSS-REFERENCE TO RELATED APPLICATION

This application is a continuation-in-part of U.S. patent application Ser. No. 15/968,425, filed 1 May 2018, which is a continuation-in-part of U.S. patent application Ser. No. 15/910,601, filed 2 Mar. 2018, the disclosures of which are incorporated herein by reference for any and all purposes.

FIELD OF THE INVENTION

The present invention relates generally to hydroponic growing systems and, more particularly, to a hydroponic tower that provides increased planting consistency, decreased manufacturing time and cost, and improved tower characteristics (e.g., strength, ease of cleaning, efficiency of use, etc.).

BACKGROUND OF THE INVENTION

Given the continued growth of the world's population, and given that the regions allocated for agricultural pursuits have decreased or simply become less favorable to such activities, the ability of conventional farms to feed the world's growing population has become increasingly taxed. Additionally, since population centers and agricultural centers are frequently not co-located, and due to the time and expense associated with shipping agricultural goods, in many regions of the world only the wealthy are able to obtain adequate supplies of non-processed food, i.e., raw fruits and vegetables. Furthermore, the fruits and vegetables that do reach population centers are likely to be of decreased nutritional content and flavor, both due to the distance that they have traveled and the fact that much of today's produce is bred for durability and fertility rather than flavor & nutrition. As a result, there has been a renewed interest in soilless growing techniques that do not require the use of pesticides, drastically reduce the use of water, and allow for growing varieties that are bred for nutrition and flavor instead of durability.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, in order to achieve large-scale adoption of these techniques it is vital that the cost per plant be competitive with the costs associated with conventional farming techniques. Accordingly, the present invention provides a hydroponic tower that achieves increased planting consistency, increased tower strength, decreased manufacturing time and cost, and simplified maintenance between use cycles.

SUMMARY OF THE INVENTION

The present invention provides a hydroponic tower comprised of (i) a tower body that defines a first tower cavity, where the first tower cavity is configured to provide a passageway for a water/nutrient mix; (ii) a first tower face plate, where the first tower face plate includes a first plurality of plant container cut-outs configured to accept a first plurality of plant containers; (iii) a single piece hinge member comprised of a flexible material that hingeably couples the first tower face plate to the tower body, where the single piece hinge member is integral to the tower body and integral to the first tower face plate, and where the first tower face plate is positionable relative to the tower body in at least a first tower cavity closed position and a first tower cavity open position; and (iv) a first fastener configured to temporarily latch the first tower face plate to the tower body when the first tower face plate is in the first tower cavity closed position. The single piece hinge member may be integrated within a wall of the tower body, where the tower body wall is comprised of a second material that is different from the flexible material comprising the single piece hinge member. The inner wall surface of the tower body wall may be continuous with the inner hinge surface of the single piece hinge member. The outer wall surface of the tower body wall may be continuous with the outer hinge surface of the single piece hinge member. The first fastener may be comprised of a first snap-fit fastener. The first snap-fit fastener may be comprised of a first member and a second member, where the first member is formed along an edge portion of the first tower face plate and the second member is formed along an edge portion of the tower body. The first member of the first snap-fit fastener may be comprised of at least one protruding edge and the second member of the first snap-fit fastener may be comprised of at least one snap-in area that is complementary to the at least one protruding edge.

The hydroponic tower may be a dual-sided hydroponic tower, where the tower body defines a first tower cavity and a second tower cavity, and where the second tower cavity is configured to provide a second passageway for the water/nutrient mix. The hydroponic tower may further comprise (i) a second tower face plate, where the second tower face plate includes a second plurality of plant container cut-outs configured to accept a second plurality of plant containers; (ii) a second single piece hinge member comprised of a flexible material that hingeably couples the second tower face plate to the tower body, where the second single piece hinge member is integral to the tower body and integral to the second tower face plate, and where the second tower face plate is positionable relative to the tower body in at least a second tower cavity closed position and a second tower cavity open position; and (iii) a second fastener configured to temporarily latch the second tower face plate to the tower body when the second tower face plate is in the second tower cavity closed position. The second single piece hinge member may be integrated within a second wall portion of the tower body. The inner wall surface of the tower body wall may be continuous with the inner hinge surface of the second single piece hinge member. The outer wall surface of the tower body wall may be continuous with the outer hinge surface of the second single piece hinge member. The second fastener may be comprised of a second snap-fit fastener. The second snap-fit fastener may be comprised of a third member and a fourth member, where the third member is formed along an edge portion of the second tower face plate and the fourth member is formed along a second edge portion of the tower body. The third member of the second snap-fit fastener may be comprised of at least one protruding edge and the fourth member of the second snap-fit fastener may be comprised of at least one snap-in area that is complementary to the at least one protruding edge.

In a configuration in which the hydroponic tower is a dual-sided hydroponic tower, the hydroponic tower may include (i) a first V-shaped groove running along the length of a first side of the tower body, where the first V-shaped groove is centered between the first tower cavity and the second tower cavity; and (ii) a second V-shaped groove running along the length of a second side of the tower body, where the second V-shaped groove is centered between the first tower cavity and the second tower cavity. In this configuration the first V-shaped groove may be formed from a first side wall portion corresponding to the first tower cavity and a second side wall portion corresponding to the second tower cavity, and the second V-shaped groove may be formed from a third side wall portion corresponding to the first tower cavity and a fourth side wall portion corresponding to the second tower cavity.

In a configuration in which the hydroponic tower is a dual-sided hydroponic tower, the first rear cavity wall and the second rear cavity wall may each include a plurality of vertical ridges. The vertical ridges may be of uniform width.

In a configuration in which the hydroponic tower is a dual-sided hydroponic tower, the tower may include a cavity interposed between the first rear cavity wall and the second rear cavity wall.

The tower body, the first tower face plate and the second tower face plate may be fabricated from plastic (e.g., polyethylene, polypropylene, polyvinyl chloride, polytetrafluoroethylene, and acrylonitrile butadiene styrene, etc.) and may be white. The tower body, the first tower face plate and the second tower face plate may be fabricated from a rigid polyvinyl chloride material and the first and second hinge members may be comprised of a flexible polyvinyl chloride material.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
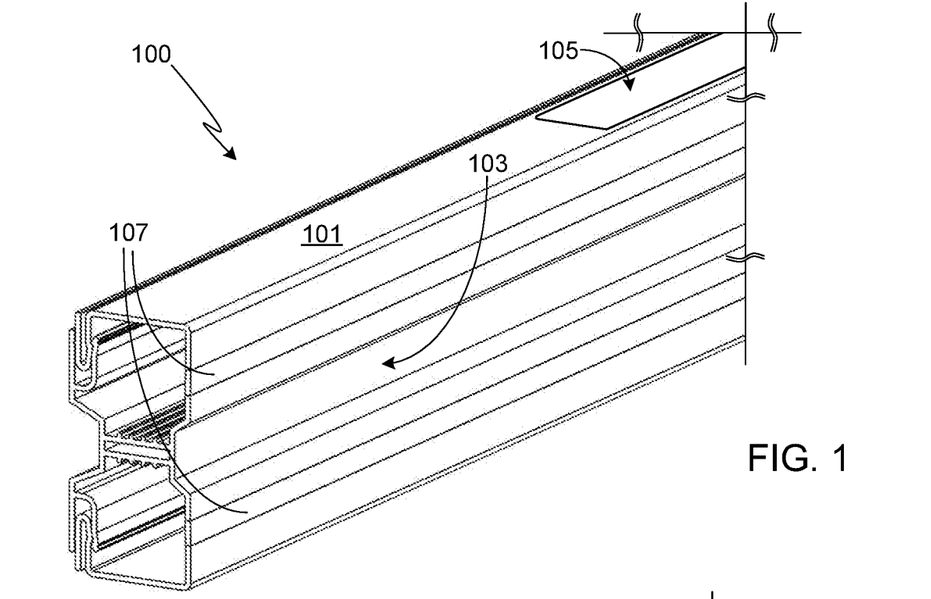
FIG. 1 provides a perspective view of a portion of an exemplary dual-sided, hydroponic tower with hingeably coupled front face plates, this view showing the face plates in the closed position.
Figure 2:
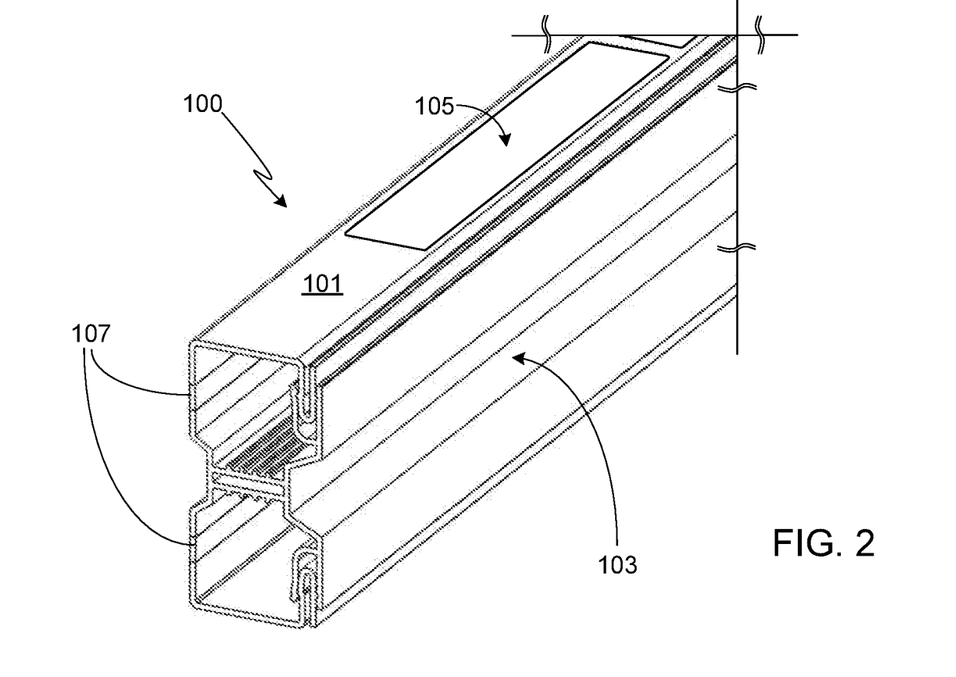
FIG. 2 provides a perspective view of the portion of the exemplary dual-sided, hydroponic tower shown in FIG. 1, this figure providing an alternate view of the tower.

FIGS. 1 and 2 provide two different perspective views of a portion of an exemplary dual-sided, hydroponic tower 100 in which each front face plate 101 is hingeably coupled to the tower body 103. In FIGS. 1 and 2 each front face plate 101 is shown in the closed position. Although the dual-sided configuration is preferred, the invention may also be utilized in a single-sided configuration.

In order to illustrate the tower design, tower 100 includes a plurality of cut-outs 105 for use with compatible plant plug holders. It should be understood that the hydroponic tower design disclosed in the present application is not limited to use with a particular cut-out configuration or a particular plant plug holder, rather the hydroponic tower design disclosed herein may be used with any suitable cut-out and suitably sized hydroponic plant plug holder. As such, cut-outs 105 are only meant to illustrate, not limit, the present tower design and it should be understood that the present invention is equally applicable to other cut-out designs. Suitable plant plug holders may be ultrasonically welded, vibrationally welded, bonded, or otherwise attached to either the front surface or the rear surface of tower face 101. A suitable front surface mounted plant plug holder is disclosed in co-assigned and co-pending U.S. patent application Ser. No. 15/910,445, filed 2 Mar. 2018, the disclosure of which is incorporated herein for any and all purposes. A suitable rear surface mounted plant plug holder is disclosed in co-assigned and co-pending U.S. patent application Ser. No. 16/577,151, filed 20 Sep. 2019, the disclosure of which is incorporated herein for any and all purposes.

The hydroponic tower of the present invention utilizes a single piece, integrated hinge member 107 that allows the tower face plate(s) to open about the hinge member, thereby improving access to the inside of the tower and simplifying tower maintenance (e.g., tower cleaning) as well as other tower related processes. Preferably tower 100 is fabricated from a plastic material (e.g., polyethylene, polypropylene, polyvinyl chloride, polytetrafluoroethylene, acrylonitrile butadiene styrene (ABS), etc.), and more preferably from a polyvinyl chloride (PVC) plastic. To form the integrated hinge, hinge member 107 is comprised of a flexible material while all other aspects of the tower (i.e., tower body 103 and tower face plates 101) are comprised of a rigid material. Preferably tower 100 is manufactured using an extrusion process whereby the tower is extruded as a single piece, but in which a rigid material such as a rigid PVC is used for the tower body/face plate components and a flexible material such as a flexible PVC is used for the hinge member. As is known by those of skill in the art, the primary difference between rigid and flexible PVC is in the amount of plasticizer added to the PVC where an increase in the amount of added plasticizer increases the material's flexibility (i.e., ductility). Tower face plate cut-outs 105 are preferably punched out during the extrusion process although it should be understood that other manufacturing techniques may be used to form the cut-outs (e.g., using a computer numerical control (CNC) machine to fabricate the cut-outs). In the preferred embodiment, the tower is fabricated from an opaque PVC plastic that is colored white. Using an opaque PVC material that prevents light from entering the tower helps to minimize algae blooms while the white coloring increases the amount of light reflected back onto the plants.

It will be appreciated that the physical requirements placed on the hydroponic tower depend on the exact nature of its intended use. Some of the use characteristics that impact design requirements include (i) desired tower height, (ii) number of plants per unit length, (iii) expected plant size at maturity and prior to harvesting, (iv) expected weight per plant and corresponding container, (v) intended means used to transfer plants/containers into and out of the tower, (vi) water/nutrient delivery system, etc. In at least one preferred embodiment, the tower of the present invention is designed to hold a minimum distributed load of 25 pounds over 200 inches for a single-sided tower, and a minimum distributed load of 50 pounds over 200 inches for a dual-sided tower.

In general, the cross-section of the tower cavities disclosed herein are selected to be in the range of 1.5 inches by 1.5 inches to 3 inches by 3 inches, where the term "tower cavity" refers to the region within the body of the tower and behind the tower face plate. Preferably wall thickness for the tower is within the range of 0.065 to 0.075 inches. A dual-sided hydroponic tower, such as that shown in FIGS. 1 and 2, has two back-to-back cavities, each preferably within the noted size range. It should be understood, however, that the invention is not limited to tower cavities with a particular cross-section or size, and the descriptions provided herein are based on preferred embodiments of the invention and are not meant to limit the scope of the invention.

The strength of the tower depends on the specific tower design which, in large part, depends on the intended crop, the means used to plant and harvest, the intended water/nutrient delivery system, the desired tower-to-tower packing density, etc. As a general guideline, however, the inventors have found that in addition to providing increased packing density and a lower overall tower cost (based on cost per plant), the dual-sided tower has the added benefit of dramatically increasing tower stiffness.

Figure 3:
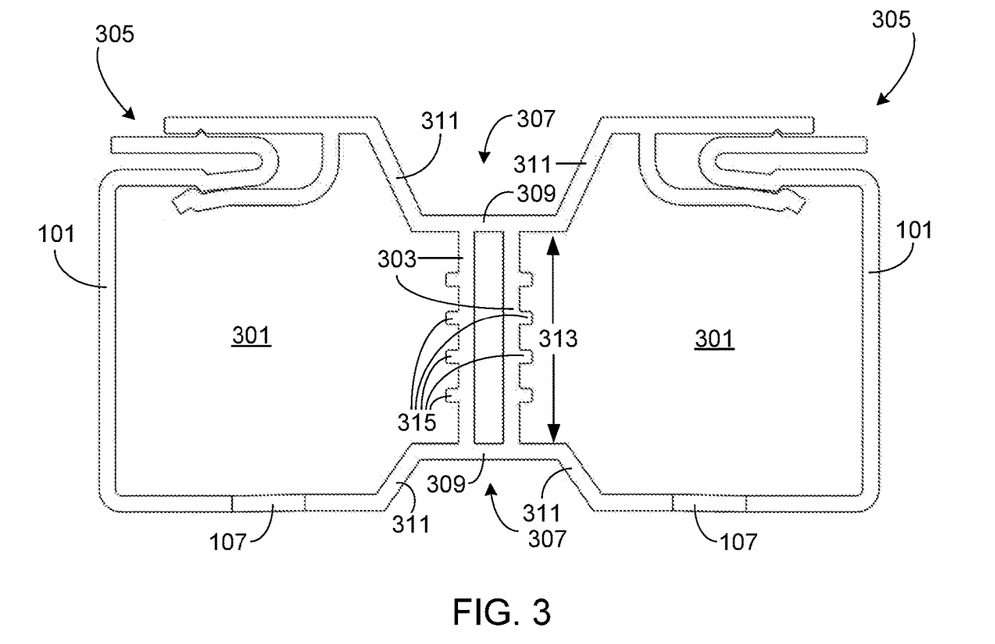
FIG. 3 provides a cross-sectional view of the dual-sided, hydroponic tower shown in FIGS. 1 and 2, this view showing both face plates in the closed position.
Figure 4:
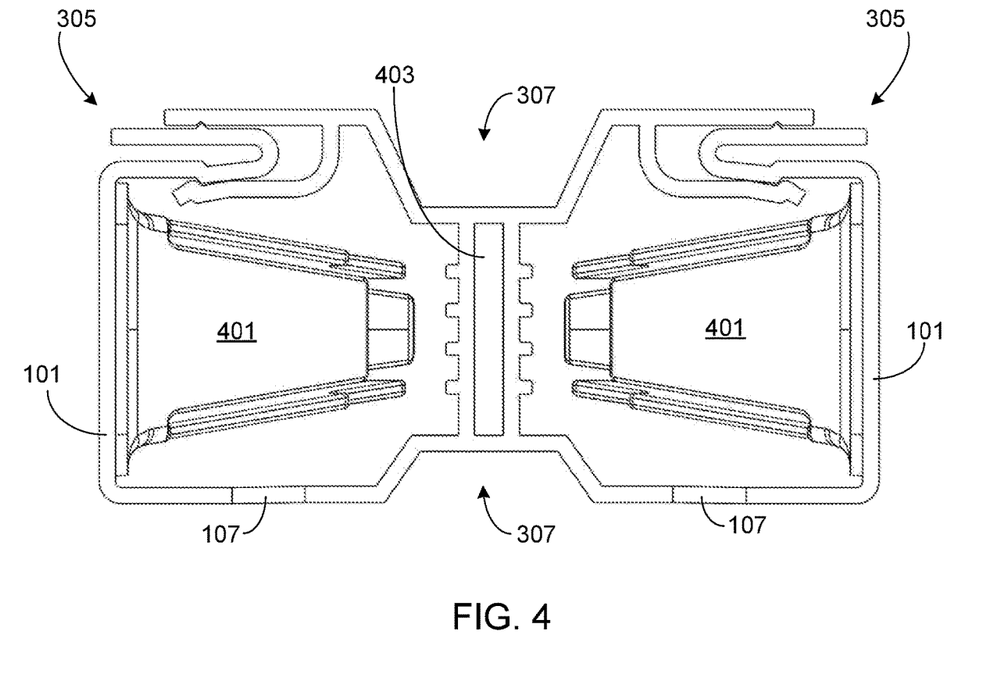
FIG. 4 provides a similar cross-sectional view of the dual-sided, hydroponic tower as that provided in FIG. 3, this view including plant plug holders mounted to the closed face plates.
Figure 5:
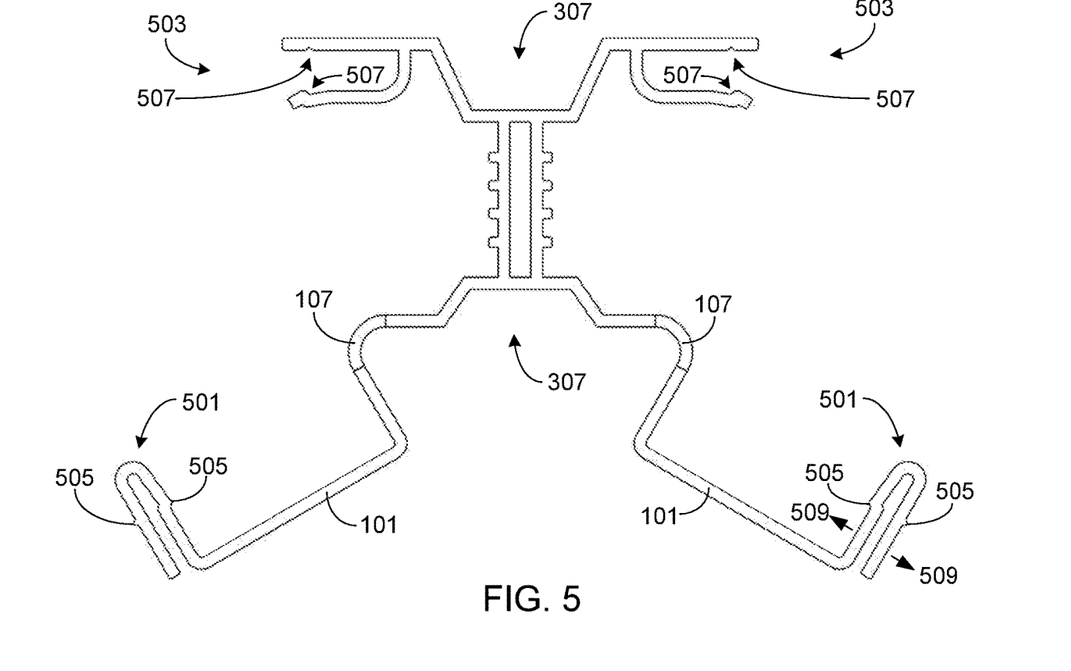
FIG. 5 provides a cross-sectional view of the dual-sided, hydroponic tower shown in FIGS. 1-3, this view showing both face plates in the open position.

FIG. 3 provides a cross-sectional view of tower 100 with the face plates 101 in the closed position while FIG. 4 provides the same cross-sectional view as in FIG. 3, except for the addition of a plant plug holder 401 attached to the rear surface of each face plate. FIG. 5 provides a similar cross-sectional view of tower 100 as that provided in FIG. 3, except that each face plate 101 is open about hinge member 107.

The use of a hinged front face plate has been found by the inventors to simplify tower maintenance in general, and tower cleaning in particular. For example, to clean the tower the face plates 101 are unhinged (i.e., opened) from the body 103 to allow easy access to each body cavity 301. After cleaning, the face plates are closed. Due to the use of an integrated, smooth format hinge member 107, the hinge members are as easy to clean as any other surface within the body cavity 301. Additionally since the face plates 101 are integral to the tower body 103, face plate alignment is not an issue with the disclosed design. Furthermore, if the planting and/or harvesting operations are performed with the face plate in the open position, for the dual-sided configuration both face plates can be opened and simultaneously planted and/or harvested, thus eliminating the step of planting and/or harvesting one side and then rotating the tower and planting and/or harvesting the other side.

One of the benefits of the integrated hinge design described herein is that the face plate can be opened to a very large angle as illustrated in FIG. 5, thereby simplifying cleaning of the body cavity 301. In at least one preferred embodiment of the invention, at full opening the plane of face plate 101 is at an angle of approximately 120 degrees relative to the rear cavity wall 303.

Any of a variety of different fastener types can be used to latch face plate 101 to the tower body 103 when the face plate is in the closed position. In the preferred and illustrated embodiment, fasteners 305 are comprised of snap-fit fasteners. Each snap-fit fastener 305 is comprised of a first portion 501 formed on the edge of face plate 101 and a second portion 503 formed on the complementary edge of the tower body. In the illustrated embodiment, fastener portion 501 fits within fastener portion 503. To keep the face plate in the closed position, preferably one of the fastener portions, e.g., fastener portion 501, includes one or more protruding edges 505 that fit within complementary snap-in areas 507 (e.g., a snap-in slot or dimple) in the complementary snap-in fastener portion 503. In the embodiment shown in the figures, first fastener portion 501 utilizes a folded member design that results in a slight outwardly directed force (i.e., applied in directions 509) which, in turn, helps to maintain the protruding edges 505 within the complementary snap-in areas 507.

As shown in the figures, preferably the dual-sided tower includes a modified "V" shaped groove 307 that runs along the length of the tower, and on either side of the tower as shown. Grooves 307 are centered on either side of the tower, evenly splitting the two tower cavities 301. Each modified V-shaped groove 307 includes an inner groove wall 309 bounded by a pair of sloped groove walls 311. Grooves 307 provide an alignment feature that can be used when coupling planters, harvesters, or other equipment to the tower. This is an especially useful feature in an automated system. An additional benefit of grooves 307 is that they reduce the width 313 of rear cavity surface 303. Since water and nutrients are preferably supplied to the plants within the hydroponic tower by directing the water/nutrient flow along each rear cavity wall 303, reducing the width of this surface increases the likelihood that the water and nutrients flowing down the surface reach the plants contained within the tower.

Figure 6:
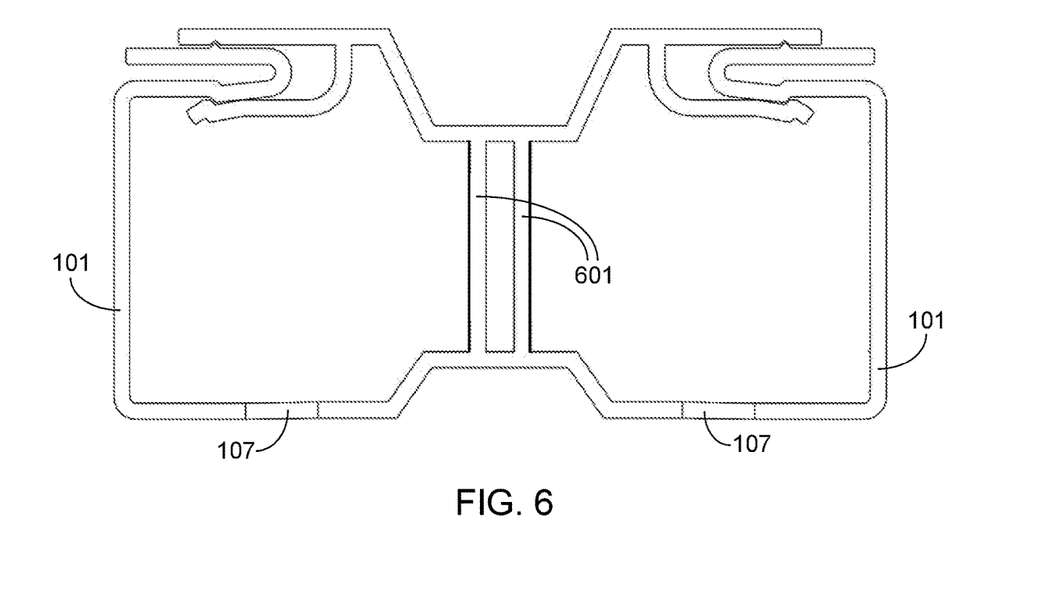
FIG. 6 provides a cross-sectional view of a dual-sided, hydroponic tower similar to that shown in FIG. 3 except that the rear cavity walls do not include ridges.

The hydroponic towers of the present invention are not limited to a specific water/nutrient delivery system. Thus, for example, a wicking system may be implemented within the disclosed towers. As noted above, however, in the preferred embodiment the water/nutrient mix is directed towards the cavity rear surface 303 of each tower body cavity 301 where the water/nutrient mix can flow downward, feeding the plants contained in the individual plant containers that are fit into each tower cut-out. In order to help control water/nutrient flow along the back wall of the tower cavity, in at least one preferred embodiment a series of vertical ridges 315 are fabricated onto the rear cavity wall 303 of each cavity 301. The ridges formed on the rear cavity wall 303 may be uniform or non-uniform (e.g., where the ridges in the center are wider and/or deeper than those to either side of the wall center). While ridges 315 are preferred, it should be understood that they are not a necessary feature of the invention. For example, FIG. 6 provides a cross-sectional view of a dual-sided hydroponic tower similar to that shown in FIG. 3 except that the rear cavity walls 601 do not include ridges.

Figure 7:
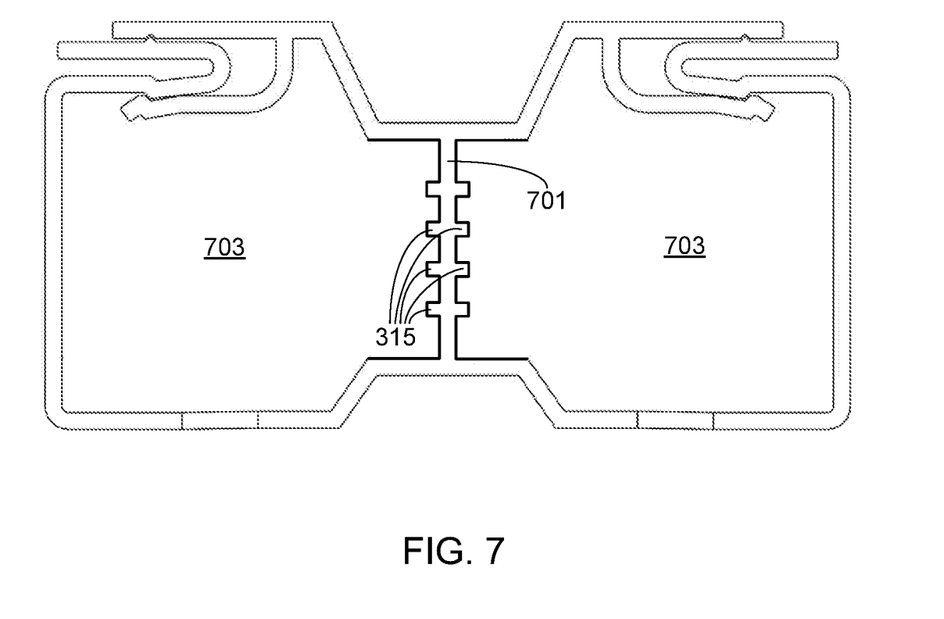
FIG. 7 provides a cross-sectional view of a dual-sided, hydroponic tower similar to that shown in FIG. 3 except both cavities use a common rear cavity wall.
Figure 8:
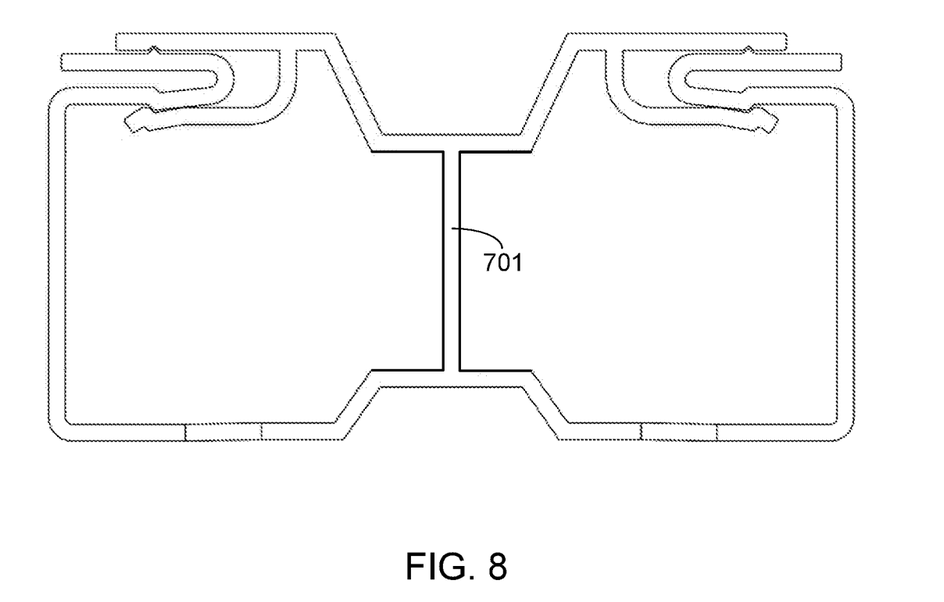
FIG. 8 provides a cross-sectional view of a dual-sided, hydroponic tower similar to that shown in FIG. 7 except that the common rear cavity wall does not include ridges.

In the preferred embodiment of the invention, the rear cavity walls 303 are separated by a cavity 403. Separating the rear cavity walls by cavity 403 increases tower stiffness and rigidity, a beneficial quality when large towers are used or the towers contain numerous heavy plants at plant maturity. It should be understood, however, that the invention does not require the use of a rear wall separating cavity 403. For example, FIGS. 7 and 8 illustrate alternate configurations of the invention in which a common wall 701 separates rear tower cavities 703. Common wall 701 may utilize ridges 315 (e.g., FIG. 7) or not (e.g., FIG. 8).

Figure 9:
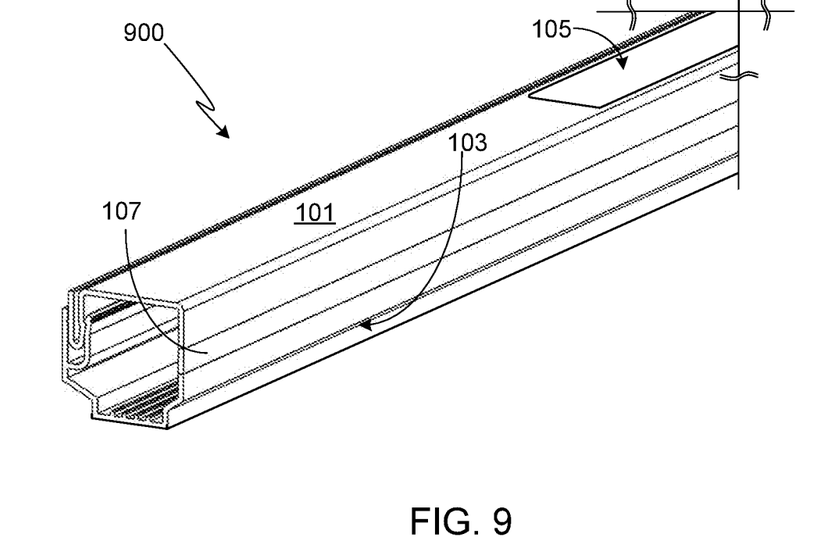
FIG. 9 provides a perspective view of a portion of a single-sided, hydroponic tower that utilizes the hinge configuration shown in FIGS. 1-5, but in a single-sided configuration.
Figure 10:
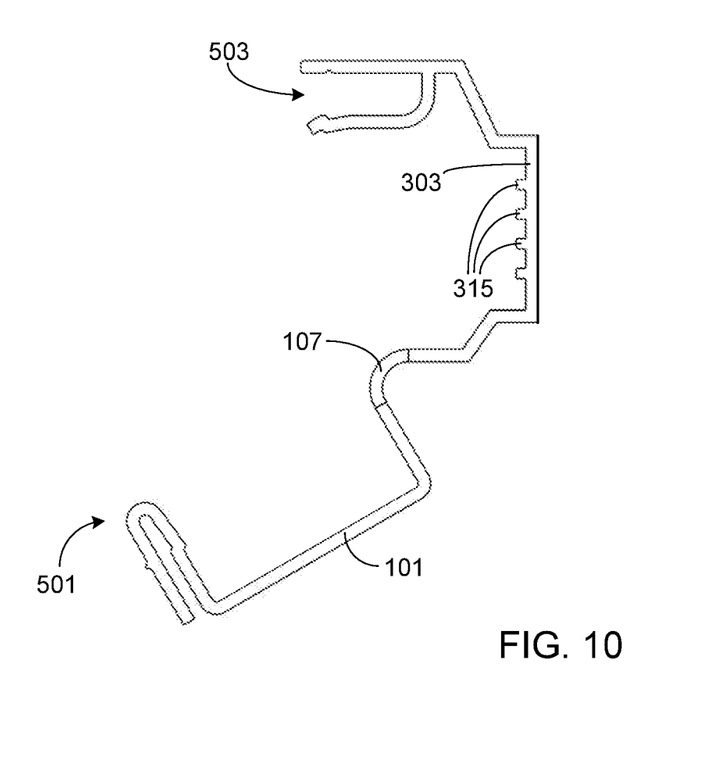
FIG. 10 provides a cross-sectional view of the single-sided configuration shown in FIG. 9 with the front face in the open position.
Figure 11:
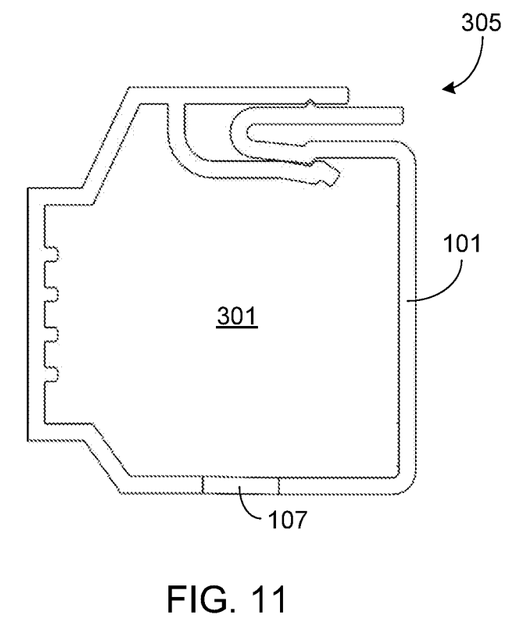
FIG. 11 provides a cross-sectional view of the single-sided configuration shown in FIGS. 9 and 10 with the front face in the closed position.
Figure 12:
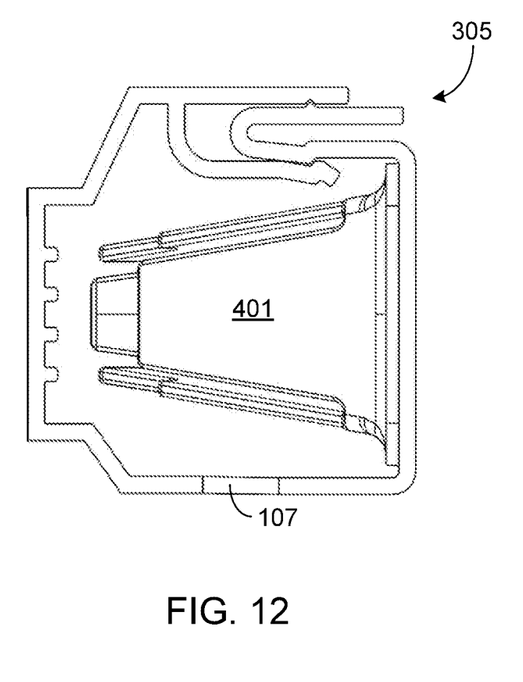
FIG. 12 provides a similar cross-sectional view as that provided in FIG. 11 except with the inclusion of a plant plug holder attached to the front tower face.

As previously noted, while the dual-sided hydroponic tower configuration is preferred from an efficiency point of view, the present invention may also be used with a single-sided configuration. FIG. 9 provides a perspective view of a portion of a single-sided hydroponic tower 900 that utilizes the hinge design and configuration described relative to FIGS. 3-5, but in a single-sided configuration. FIGS. 10 and 11 provide cross-sectional views of the single-sided configuration with the front face 101 shown in the open and closed positions, respectively. FIG. 12 provides a similar cross-sectional view as that provided in FIG. 11 except for the inclusion of a plant plug holder 401 attached to the front face. It should be understood that the single-sided configuration, like the dual-sided configuration, may or may not include ridges 315.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A dual-sided hydroponic tower, comprising:
   a tower body, said tower body defining a first tower cavity and a second tower cavity, said first tower cavity configured to provide a passageway for a water/nutrient mix, said second tower cavity configured to provide a second passageway for said water/nutrient mix;
   a first tower face plate, said first tower face plate comprising a first plurality of plant container cut-outs, said first plurality of plant container cut-outs configured to accept a first plurality of plant plug holders;
   a second tower face plate, said second tower face plate comprising a second plurality of plant container cut-outs, said second plurality of plant container cut-outs configured to accept a second plurality of plant plug holders;
   a single piece hinge member, said single piece hinge member comprised of a flexible material, said single piece hinge member hingeably coupling said first tower face plate to said tower body, said single piece hinge member integral to said tower body and integral to said first tower face plate, wherein said first tower face plate is positionable relative to said tower body in at least a first tower cavity closed position and a first tower cavity open position;
   a second single piece hinge member, said second single piece hinge member comprised of said flexible material, said second single piece hinge member hingeably coupling said second tower face plate to said tower body, said second single piece hinge member integral to said tower body and integral to said second tower face plate, wherein said second tower face plate is positionable relative to said tower body in at least a second tower cavity closed position and a second tower cavity open position;
   a first fastener configured to temporarily latch said first tower face plate to said tower body when said first tower face plate is in said first tower cavity closed position; and
   a second fastener configured to temporarily latch said second tower face plate to said tower body when said second tower face plate is in said second tower cavity closed position.

2. The dual-sided hydroponic tower of claim 1, said single piece hinge member integrated within a first wall portion of said tower body, said second single piece hinge member integrated within a second wall portion of said tower body, said first wall portion and said second wall portion of said tower body comprised of a second material, wherein said second material is different from said flexible material comprising said single piece hinge member and said second single piece hinge member.

3. The dual-sided hydroponic tower of claim 2, wherein a first inner wall surface corresponding to said first wall portion of said tower body is continuous with a first inner hinge surface corresponding to said single piece hinge member, wherein a second inner wall surface corresponding to said second wall portion of said tower body is continuous with a second inner hinge surface corresponding to said single piece hinge member, wherein a first outer wall surface corresponding to said first wall portion of said tower body is continuous with a first outer hinge surface corresponding to said second single piece hinge member, and wherein a second outer wall surface corresponding to said second wall portion of said tower body is continuous with a second outer hinge surface corresponding to said second single piece hinge member.

4. The dual-sided hydroponic tower of claim 1, said first fastener comprising a first snap-fit fastener, and said second fastener comprising a second snap-fit fastener.

5. The dual-sided hydroponic tower of claim 4, said first snap-fit fastener comprised of a first member and a second member, said first member formed along an edge portion of said first tower face plate and said second member formed along a first edge portion of said tower body, said second snap-fit fastener comprised of a third member and a fourth member, said third member formed along an edge portion of said second tower face plate and said fourth member formed along a second edge portion of said tower body.

6. The dual-sided hydroponic tower of claim 5, said first member comprised of a first protruding edge and said second member comprised of a first snap-in area, said first snap-in area complementary to said first protruding edge, said third member comprised of a second protruding edge and said fourth member comprised of a second snap-in area, said second snap-in area complementary to said second protruding edge.

7. The dual-sided hydroponic tower of claim 1, further comprising:
a first V-shaped groove running along the length of a first side of said tower body, said first V-shaped groove centered between said first tower cavity and said second tower cavity; and
a second V-shaped groove running along the length of a second side of said tower body, said second V-shaped groove centered between said first tower cavity and said second tower cavity.

8. The dual-sided hydroponic tower of claim 7, said first V-shaped groove formed from a first side wall portion corresponding to said first tower cavity and a second side wall portion corresponding to said second tower cavity; and
said second V-shaped groove formed from a third side wall portion corresponding to said first tower cavity and a fourth side wall portion corresponding to said second tower cavity.

9. The dual-sided hydroponic tower of claim 1, further comprising:
a first plurality of vertical ridges formed on a first rear cavity wall, said first rear cavity wall corresponding to said first tower cavity; and
a second plurality of vertical ridges formed on a second rear cavity wall, said second rear cavity wall corresponding to said second tower cavity.

10. The dual-sided hydroponic tower of claim 9, said first plurality of vertical ridges of uniform width, and said second plurality of vertical ridges of uniform width.

11. The dual-sided hydroponic tower of claim 1, further comprising a cavity interposed between a first rear cavity wall and a second rear cavity wall, wherein said first rear cavity wall corresponds to said first tower cavity and said second rear cavity wall corresponds to said second tower cavity.

12. The dual-sided hydroponic tower of claim 1, said tower body, said first tower face plate and said second tower face plate fabricated from a plastic material.

13. The dual-sided hydroponic tower of claim 12, said plastic material selected from the group consisting of polyethylene, polypropylene, polyvinyl chloride, polytetrafluoroethylene, and acrylonitrile butadiene styrene.

14. The dual-sided hydroponic tower of claim 12, wherein said plastic material is white.

15. The dual-sided hydroponic tower of claim 1, said tower body, said first tower face plate and said second tower face plate fabricated from a rigid polyvinyl chloride material, and said flexible material comprising said single piece hinge member and said second single piece hinge member comprised of a flexible polyvinyl chloride material.

* * * * *